June 18, 1946.　　L. H. BEDFORD　　2,402,359
ELECTRICAL APPARATUS
Filed Sept. 28, 1943
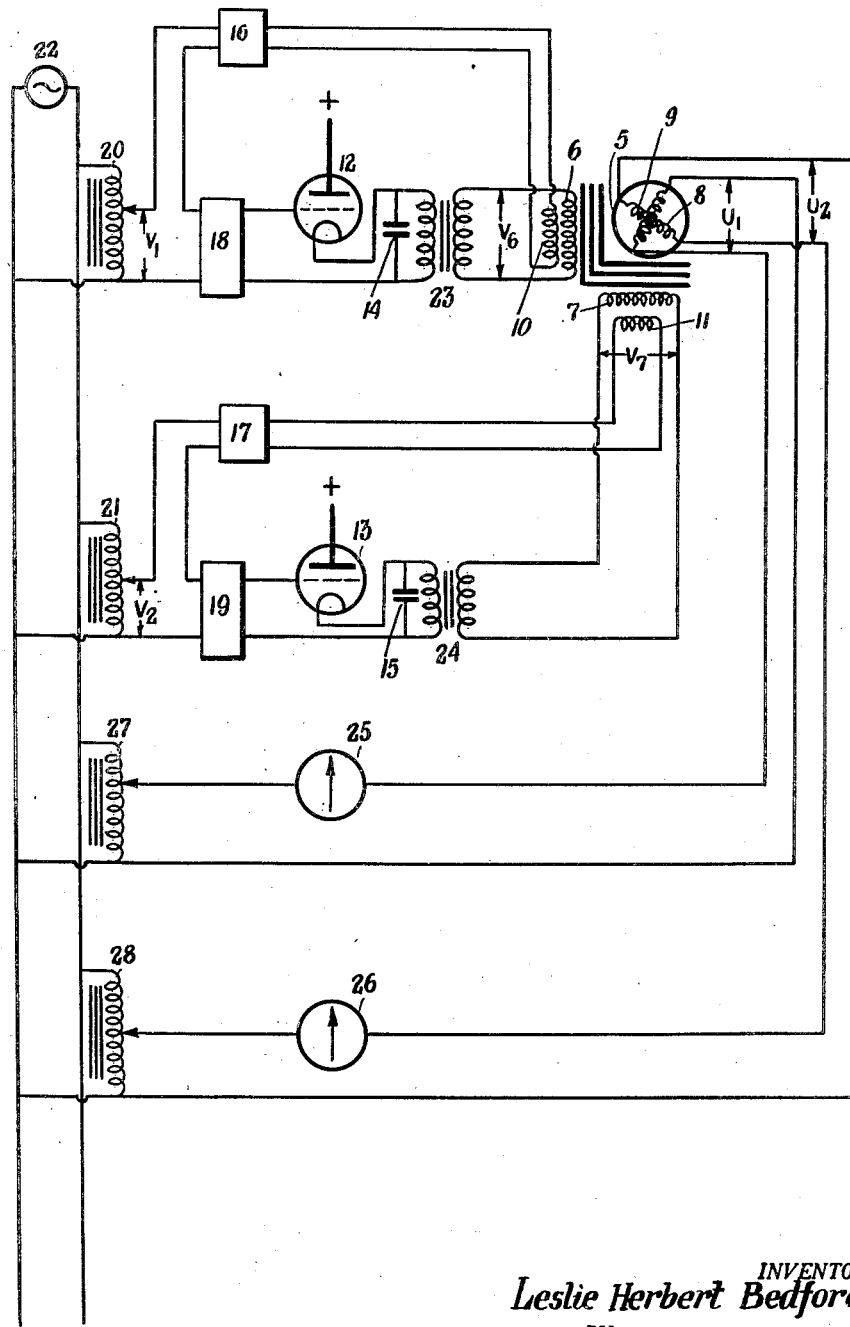
INVENTOR.
Leslie Herbert Bedford
BY
ATTORNEY Patented June 18, 1946

2,402,359

UNITED STATES PATENT OFFICE 2,402,359

ELECTRICAL APPARATUS

Leslie Herbert Bedford, London, England, assignor to A. C. Cossor Limited, London, England, a British company Application September 28, 1943, Serial No. 504,110
In Great Britain October 7, 1942

9 Claims. (Cl. 171—119)

This invention relates to alternating current circuits comprising iron-cored inductive devices. It is particularly applicable to the purpose of eliminating errors in alternating current measuring and calculating apparatus which arise from the non-linear magnetic saturation characteristics of iron-cored inductive devices employed therein.

One aspect of the invention is directed to the problem of producing, in such a device, an alternating magnetic flux which varies proportionally in amplitude with, and keeps in phase quadrature with, an alternating input voltage. The circuit according to this aspect of the invention comprises an amplifier having its output applied to a primary winding of the inductive device, means comprising a secondary winding linking the magnetic flux produced by said primary winding to develop a feedback voltage substantially in phase quadrature with said flux and substantially proportional in amplitude thereto, and nearly equal to the input voltage, and means to inject said feedback voltage degeneratively into the input circuit of the amplifier.

Another aspect of the invention is directed to the problem of producing, from an iron-cored inductive device, a secondary alternating voltage which varies proportionally in amplitude with, and keeps in phase with, an alternating input voltage. The circuit according to this aspect of the invention comprises an amplifier having its output applied to a primary winding on said inductive device, means comprising a secondary winding on said inductive device to develop a feedback voltage nearly equal to the input voltage, and means to inject said feedback voltage degeneratively into the input circuit of said amplifier.

The invention is particularly applicable to the problem of exciting a low frequency iron-cored goniometer, sometimes known as a "magslip resolver." This device will normally comprise relatively rotatable stator and rotor elements, each having an iron core and each having two windings arranged 90° apart. When a constant alternating voltage is applied to one of the windings on one element, say the stator, the voltage produced in one of the windings on the other element (the rotor) is proportional to the sine of the angle to which the rotor is set relatively to the stator, and the voltage produced in the other rotor winding is proportional to the cosine of said angle. When a constant alternating voltage is also applied to the other stator winding, additional voltages will be produced in the rotor windings, proportional respectively to the cosine and sine of the said angle of setting. When the amplitudes of the voltages applied to the stator windings are varied, the non-linear magnetic characteristics of the iron cores will produce variations of phase angle with amplitude, and the voltages produced in the rotor windings will not vary in exact proportion with the voltages applied to the stator windings. A principal feature of the invention is the avoidance of this difficulty.

In the application of the invention to magslip resolvers, the secondary windings employed to develop the feedback voltages will be auxiliary windings arranged on the same element (stator or rotor) as the primary windings—that is to say, the windings which are used to excite the resolver. Where two primary windings 90° apart are employed, each of the auxiliary secondary windings will be in space-phase with the primary winding into the circuit of which it provides feedback.

Further aspects of the invention will be apparent from the accompanying claims.

The accompanying drawing shows a circuit diagram of an electrical calculating apparatus embodying the invention.

The purpose of this apparatus is to develop two output alternating voltages $U_1$ and $U_2$, the amplitudes of which are related to two input voltages $V_1$ and $V_2$ in accordance with the laws:

$$U_1 = V_1 \cos \theta - V_2 \sin \theta$$
$$U_2 = V_1 \sin \theta + V_2 \cos \theta$$

where $\theta$ is the angular setting of the rotor of a magslip resolver 5 relative to the stator thereof. The voltages $U_1$, $U_2$, $V_1$, $V_2$ all have the same low frequency and the same phase.

The input voltages $V_1$, $V_2$ are tapped off by movable tappings from variable ratio auto-transformers 20, 21, which are connected across a common alternating supply source 22 of constant low frequency, say 50 cycles. The tappings of the auto-transformers may be continuously and independently moved, either manually or automatically, so that voltages $V_1$ and $V_2$, while remaining in phase with each other, are continuously varied in amplitude in proportion to two independently varying magnitudes $x$ and $y$, which they will then continuously represent.

The primary windings 6 and 7 of the magslip resolver 5 are both arranged on the stator and are disposed 90° apart so that no voltage is produced in either by the flux which is induced by the excitation of the other. The ordinary secondary windings 8 and 9 are both arranged on the rotor and are similarly disposed at an angle of 90° to each other. Voltages are excited in these secondary windings by the fluxes which are induced in the iron cores by excitation of the primary windings 6 and 7. The voltages U₁ and U₂ excited in these windings 8 and 9 respectively are approximately given by:

$$U_1 = V_6 \cos\theta - V_7 \sin\theta$$
$$U_2 = V_6 \sin\theta + V_7 \cos\theta$$

where $V_6$ and $V_7$ are the alternating voltages across windings 6 and 7. These equations would be exactly true only in the case of zero resistance in the primary windings 6 and 7; in practice the magnetizing currents in these windings cause resistance drops which introduce errors.

In the arrangement according to the invention, auxiliary secondary windings 10 and 11 are provided. These are placed on the stator co-axially with primary windings 6 and 7 respectively and are employed to provide degenerative feedback voltages substantially proportional to, and in quadrature with, the fluxes actually induced in the two perpendicular axial directions. Windings 6 and 10 may be wound together as a bifilar winding, and similarly may windings 7 and 11.

The primary windings 6 and 7 are excited from the input alternating voltages $V_1$ and $V_2$ through thermionic valve amplifiers 12 and 13. These are shown as modified cathode follower amplifiers; but other forms of amplifier may alternatively be used, such as those in which the outputs are developed across anode loads. If cathode loads are chosen, the primary windings 6 and 7 may be directly connected to form these loads provided that their impedances are sufficiently high. It will normally be preferred, however, to connect them as cathode loads through the medium of output transformers as shown at 23 and 24, which will also serve to eliminate direct current from the primary windings 6 and 7. In any case, the loads are preferably tuned to the frequency of source 22 by parallel condensers 14 and 15.

The auxiliary secondary windings 10 and 11 are connected back degeneratively to the input sides of amplifiers 12 and 13. The voltages fed back from the auxiliary secondary windings 10 and 11 in opposition to input voltages $V_1$ and $V_2$ are nearly equal in amplitude and phase to the said input voltages. If the windings 10 and 11 are suitably proportioned for this purpose they may be directly connected into the input circuits, but they are shown as connected through voltage transformation devices 16 and 17 which will have the correct transformation ratio to achieve this end. Devices 16 and 17 may be voltage step-up or step-down transformers or auto-transformers having high impedances, and may be provided with means for adjusting their ratios. Alternatively they may be resistance networks or thermionic valve amplifiers.

The vector difference voltages between (a) the voltages $V_1$ and $V_2$ tapped from potentiometers 20 and 21, and (b) the output voltages from devices 16 and 17, are applied as inputs to amplifiers 12 and 13 preferably through the medium of voltage step-up devices 18 and 19. The greater the voltage step-up provided by devices 18 and 19 and amplifiers 12 and 13, the more accurate will be the compensation for errors due to magnetizing currents in the magslip resolver 5.

Devices 18 and 19 may be transformers, but will preferably be high gain thermionic valve amplifiers. Care must, of course, be taken that no phase reversals shall occur in either of these devices at any frequencies within the range for which the gain of the feedback system exceeds unity; otherwise the system will be unstable.

Whatever the nature of devices 16 and 17 and of devices 18 and 19 that may be selected, it is important that auxiliary secondary windings 10 and 11 shall not be appreciably loaded. In some applications of the invention it may also be important that the sources of input voltages $V_1$ and $V_2$ shall not be appreciably loaded.

If the voltage of the alternating current source 22 is constant, the output voltages $U_1$ and $U_2$ may be measured by simple voltmeters. If, however, there is a possibility of variation of the voltage of the supply source, it is preferable that voltages $U_1$ and $U_2$ shall be measured by nulling against voltages tapped off from potential dividers connected across source 22. The arrangement according to the invention insures that the voltages $U_1$ and $U_2$ are both in phase with the voltage of source 22.

In the arrangement shown in the drawing, the rotor windings 8 and 9 of the magslip resolver 5 are respectively connected for this purpose through null meters 25, 26, across tapped off portions of variable ratio auto-transformers 27 and 28. If the tappings of auto-transformers 27 and 28 are continuously moved so as to maintain null readings on meters 25 and 26, then the ratios of transformers 27 and 28, which may be measured by suitable scales, will continuously represent $$(x\cos\theta - y\sin\theta) \text{ and } (x\sin\theta + y\cos\theta)$$

independently of variations of the voltage of source 22.

I claim:

1. An electric system having an input and an output and comprising a transformer between said input and output having at least one iron-cored primary and secondary winding rotatably adjustable relative to each other, means to apply an alternating input voltage of constant frequency and varying amplitude from said input to said primary winding to derive an alternating voltage of like frequency from said output varying in amplitude both in accordance with the amplitude of said input voltage and the adjusting angle between said primary and secondary windings, an amplifier interposed between said input and said primary winding, and a tertiary winding for said transformer connected to the input of said amplifier and arranged to develop a degenerative feedback voltage substantially counteracting said input voltage.

2. An electric system having an input and an output and comprising a transformer between said input and output having at least one iron-cored primary and secondary winding rotatably adjustable relative to each other, means to apply an alternating input voltage of constant frequency and varying amplitude from said input to said primary winding to derive an alternating voltage of like frequency from said output varying both in accordance with the amplitude of said input voltage and the adjusting angle between said windings, an amplifier interposed between said input and said primary winding, a tertiary winding for said transformer connected to the input of said amplifier and arranged to develop a degenerative feedback voltage substantially counteracting said input voltage, and means to tune said primary winding to said constant frequency.

3. An electric system having an input and an output and comprising a transformer between said input and said output having at least one iron-cored primary and secondary winding rotatably adjustable relative to each other, means to apply an alternating input voltage of constant frequency and varying amplitude from said input to said primary winding to derive an alternating voltage of like frequency from said output varying both in accordance with the amplitude of said input voltage and the adjusting angle between said windings, an amplifier interposed between said input and said primary winding, a tertiary winding for said transformer connected to the input of said amplifier and arranged to develop a degenerative feedback voltage substantially counteracting said input voltage, and a condenser in parallel to said input winding to tune said input winding to said constant frequency.

4. An electric system having an input and an output and comprising a transformer between said input and output having a stator, a rotor, stator and rotor windings associated therewith, means to apply an alternating input voltage of constant frequency and varying amplitude from said input to said stator winding to derive an alternating voltage of like frequency from said output varying both in accordance with the amplitude of said input voltage and the adjusting angle between said stator and rotor, an amplifier interposed between said input and said stator winding, and a tertiary winding upon said stator connected to the input of said amplifier to develop a degenerative feedback voltage substantially counteracting said input voltage.

5. An electric system having a pair of inputs and a pair of outputs and comprising a transformer having pairs of iron-cored primary and secondary windings, the windings of each pair being displaced by predetermined fixed angles and the windings of one pair being rotatably adjustable relative to the windings of the other pair, said secondary windings being connected each to one of said outputs, means to apply a pair of alternating input voltages of like and constant frequency and relatively varying amplitude each from one of said inputs to one of said primary windings to derive alternating voltages from said outputs of like frequency and amplitudes varying both in accordance with the amplitude of the respective input voltage and the angular adjusting position between said primary and secondary windings, amplifiers interposed between said inputs and the respective primary windings, and a pair of tertiary windings for said transformer connected each to the input of its respective amplifier and arranged to develop degenerative feedback voltages substantially counteracting said input voltages.

6. An electric system having a pair of inputs and a pair of outputs and comprising a transformer having pairs of iron-cored primary and secondary windings, the windings of each pair being displaced by 90° and the windings of one pair being rotatably adjustably to varying angles $\theta$ relative to the windings of the other pair, said secondary windings being connected each to one of said outputs, means to apply a pair of alternating input voltages $V_1$ and $V_2$ of like and constant frequency and relatively varying amplitude each from one of said inputs to one of said primary windings to derive alternating voltages $U_1$ and $U_2$ from said outputs of like frequency and having amplitudes equal to $V_1 \cos\theta - V_2 \sin\theta$ and $V_1 \sin\theta + V_2 \cos\theta$, respectively, amplifiers interposed between said inputs and the respective primary windings, and a pair of tertiary windings for said transformer connected each to the input of the respective amplifier and arranged to develop degenerative feedback voltages substantially counteracting said input voltages.

7. An electric system having a pair of inputs and a pair of outputs and comprising a transformer having pairs of iron-cored primary and secondary windings, the windings of each pair being displaced by 90° and the windings of one pair being rotatably adjustable to varying angles $\theta$ relative to the windings of the other pair, said secondary windings being connected each to one of said outputs, means to apply a pair of alternating input voltages $V_1$ and $V_2$ of like and constant frequency and relatively varying amplitude each from one of said inputs to one of said primary windings to derive alternating voltages $U_1$ and $U_2$ from said outputs of like frequency and having amplitudes equal to $V_1 \cos\theta - V_2 \sin\theta$ and $V_1 \sin\theta + V_2 \cos\theta$, respectively, amplifiers interposed between said inputs and the respective primary windings, a tertiary winding for each of said transformers connected to the respective amplifier and arranged to develop degenerative feedback voltages substantially counteracting said input voltages, and means to tune said primary windings to said constant frequency.

8. An electric system having a pair of inputs and a pair of outputs and comprising a transformer having a stator and a rotor, a pair of stator windings angularly displaced by 90°, a pair of rotor windings also angularly displaced by 90°, said rotor windings being connected each to one of said outputs, means to apply a pair of alternating input voltages of like and constant frequency and relatively varying amplitude each from one of said inputs to one of said stator windings to derive alternating voltages from said outputs of like frequency of amplitude varying both in accordance with the amplitude of the respective input voltage and the angular position between said stator and said rotor, amplifiers interposed between said inputs and the respective stator windings, and a pair of tertiary windings upon said stator connected each to the input of the respective amplifier and arranged to develop degenerative feedback voltages substantially counteracting said input voltages.

9. An electric system having a pair of inputs and a pair of outputs and comprising a transformer having a stator and a rotor, a pair of stator windings angularly displaced by 90°, a pair of rotor windings also angularly displaced by 90°, said rotor windings being connected each to one of said outputs, means to apply a pair of alternating input voltages of like and constant frequency and relatively varying amplitudes each from one of said inputs to one of said stator windings to derive alternating voltages from said outputs of like frequency of amplitude varying both in accordance with the amplitude of the respective input voltage and the angular position between said stator and said rotor, amplifiers interposed between said inputs and the respective stator windings, a pair of tertiary windings upon said stator connected each to the input of the respective amplifier and arranged to develop degenerative feedback voltages substantially counteracting said input voltages, and a pair of condensers each in parallel to one of said stator windings to tune said stator windings to said predetermined frequency.

LESLIE HERBERT BEDFORD.